US008953697B2

(12) United States Patent
Sorrentino

(10) Patent No.: US 8,953,697 B2
(45) Date of Patent: Feb. 10, 2015

(54) CHANNEL ESTIMATION IN A WIRELESS COMMUNICATION SYSTEM

(75) Inventor: Stefano Sorrentino, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 216 days.

(21) Appl. No.: 13/581,903

(22) PCT Filed: Jan. 13, 2011

(86) PCT No.: PCT/SE2011/050032
§ 371 (c)(1), (2), (4) Date: Aug. 30, 2012

(87) PCT Pub. No.: WO2011/108968
PCT Pub. Date: Sep. 9, 2011

(65) Prior Publication Data

US 2012/0320956 A1 Dec. 20, 2012

(30) Foreign Application Priority Data

Mar. 5, 2010 (EP) .................................... 10155650

(51) Int. Cl.
*H04L 25/22* (2006.01)
*H04L 25/02* (2006.01)
*H04L 5/00* (2006.01)

(52) U.S. Cl.
CPC .......... *H04L 25/0204* (2013.01); *H04L 5/0023* (2013.01); *H04L 25/022* (2013.01); *H04L 25/0226* (2013.01); *H04L 25/0228* (2013.01)
USPC .......................................................... 375/260

(58) Field of Classification Search
USPC ................................. 375/260, 229, 267, 346
See application file for complete search history.

(56) References Cited

U.S. PATENT DOCUMENTS 8,295,383 B2 * 10/2012 Yoshida et al. ............... 375/267
8,503,556 B2 * 8/2013 Sezginer et al. .............. 375/260
(Continued)

FOREIGN PATENT DOCUMENTS

WO 2004/086706 A1 10/2004

OTHER PUBLICATIONS

Zhao et al (A Novel Channel Estimation Method for OFDM Mobile Communication Systems Based on Pilot Signals and Transform-Domain Processing, IEEE VTC97—Spring, pp. 2089-2093, Phoenix, USA, May 1997).*
(Continued)

*Primary Examiner* — Jaison Joseph
(74) *Attorney, Agent, or Firm* — Murphy, Bilak & Homiller, PLLC

(57) ABSTRACT

An estimator (111) is configured to estimate an initial representation of the channel based on the reference signal. A first transformer (112) is configured to transform the initial channel representation into a first domain suitable for suppression of a first type of disturbance. A first suppressor (113) is configured to perform suppression of the first type of disturbance in the first domain for obtaining a first suppressed channel representation. A second transformer (114) is configured to transform the first suppressed channel representation into a second domain suitable for suppression of a second type of disturbance. A second suppressor (115) is configured to perform suppression of the second type of disturbance in the second domain for obtaining a second suppressed channel representation. The first type of disturbance includes one of inter-channel interference and noise, and the second type of disturbance includes the other one of inter-channel interference and noise.

18 Claims, 10 Drawing Sheets

(56) References Cited

U.S. PATENT DOCUMENTS

| | | | | |
|---|---|---|---|---|
| 2007/0206689 | A1 * | 9/2007 | Koo et al. | 375/260 |
| 2008/0112386 | A1 | 5/2008 | Ogawa et al. | |
| 2009/0059885 | A1 * | 3/2009 | Sadek et al. | 370/343 |
| 2010/0061495 | A1 * | 3/2010 | Cho et al. | 375/346 |
| 2010/0284478 | A1 * | 11/2010 | Liao et al. | 375/260 |
| 2011/0026620 | A1 * | 2/2011 | Liao et al. | 375/260 |
| 2011/0116531 | A1 * | 5/2011 | Gore et al. | 375/213 |
| 2013/0128942 | A1 * | 5/2013 | Sikri et al. | 375/229 |

OTHER PUBLICATIONS

Diallo, M. et al. "Robust DCT based Channel Estimation for MIMO-OFDM Systems." IEEE Wireless Communications and Networking Conference (WCNC 2009), Apr. 5-8, 2009, pp. 1-5.

Auer,G. et al. "Channel Estimation for OFDM Systems with Multiple Transmit Antennas by Exploiting the Properties of the Discrete Fourier Transform." 14th IEEE Proceedings on Personal, Indoor and Mobile Radio Communication Proceedings (PIMRC 2003), vol. 2, Sep. 7-10, 2003, pp. 1954-1958.

Gao, F. et al. "Maximum Likelihood Based Estimation of Frequency and Phase Offset in DCT OFDM Systems under Non-Circular Transmissions: Algorithms, Analysis and Comparisons." IEEE Transaction on Communications, vol. 56, Issue 9, Sep. 2008.

Chen, Z. et al. "Fast Hybrid DFT/DCT Architecture for OFDM in Cognitive Radio System." Future Generation Communication and Networking (FGCN 2007), vol. 1, Dec. 6-8, 2007, pp. 301-306.

Diallo, M. et al. "On Improved DCT based Channel Estimation with Very Low Complexity for MIMO-OFDM Systems." IEEE 69th Vehicular Technology Conference (BTC Spring 2009), Apr. 26-29, 2009, pp. 1-5.

Shen, Y. et al. "Channel Estimation on OFDM Systems." Freescale Semiconductor Application Note AN3059, Jan. 2006.

Ozbek, B. et al. "Pilot-Symbol-Aided Iterative Channel Estimation for OFDM-Based Systems." 13th European Signal Processing Conference, Sep. 4-8, 2005.

* cited by examiner

CHANNEL ESTIMATION IN A WIRELESS COMMUNICATION SYSTEM

TECHNICAL FIELD

The present invention generally relates to channel estimation technology in a wireless communication system, and more particularly to improvements for interference and/or noise reduction in channel estimation.

BACKGROUND

In general, channel estimation is a vital technique used in receivers in wireless communication systems. The receiver can effectively recover transmitted information as long as it keeps track of the varying radio propagation channel conditions. The effect of the channel on the transmitted information is therefore estimated in order for the receiver to be able to correctly recover the transmitted information.

For example, next generation wireless systems such as 3GPP LTE (Rel. 8, 9) and 3GPP LTE-Advanced (Rel. 10) employ coherent demodulation techniques based on OFDM (Orthogonal Frequency Division Multiplexing) modulation. The demodulation of the received signal requires knowledge of the channel between the transmitter and the receiver, i.e. a mathematical model of the disturbance or distortion applied to the transmitted signal by the propagation environment.

In order to estimate the channel, a functional block usually called channel estimator is placed in the receiver. In order to allow channel estimation, a training-based approach is normally adopted in which the transmitter sends a reference signal, also sometimes referred to as a pilot, which is known to both the transmitter and receiver on a regular basis. The channel estimator then generates a model of the channel, based on the received distorted reference signal, to enable proper demodulation and decoding of the received signal.

Several algorithms have been proposed in literature for channel estimation. In the exemplary context of OFDM, a promising technique includes estimating the CIR (Channel Impulse Response) which corresponds to the representation of the channel in the time domain. The CIR may be transformed to the CTF (Channel Transfer Function) in the frequency domain by use of a DFT (Discrete Fourier Transform) [1-2]. The advantage of this technique is that the energy of the channel is usually concentrated in a limited number of samples. The operation of then removing the weakest samples is beneficial because it reduces the estimation noise without significantly distorting the CTF.

Another promising family of channel estimators is similar to the above described DFT based estimators, but is based on DCT (Discrete Cosine Transformation) instead of DFT [3-5]. The advantage of the DCT transformation is that it tends to focus the energy of the signal on even fewer samples, compared to DFT.

However, with the ever increasing demands for more efficient wireless communication there is a general need for further improvements of the existing channel estimation techniques.

SUMMARY

It is a general object to provide an improved method for estimating a channel and an improved channel estimator.

It is another object to provide a radio receiver, which may form part of a radio base station for example, having an improved channel estimator.

These and other objects are met by embodiments as defined by the accompanying patent claims.

A basic idea according to a first aspect is to provide a method for estimating a channel based on a reference signal in a wireless communication system. The method comprises estimating an initial representation of the channel based on the reference signal, transforming the initial channel representation into a first domain suitable for suppression of a first type of disturbance, and performing suppression of the first type of disturbance in the first domain for obtaining a first suppressed channel representation. The method further comprises transforming the first suppressed channel representation into a second domain suitable for suppression of a second type of disturbance, and performing suppression of the second type of disturbance in the second domain for obtaining a second suppressed channel representation. The first type of disturbance includes one of inter-channel interference and noise, and the second type of disturbance includes the other one of inter-channel interference and noise, and the second suppressed channel representation is an interference-suppressed and noise-suppressed channel representation.

In this way, interference suppression can be separated from noise suppression to enable efficient reduction of both interference and noise in the estimated channel. Interference suppression and noise suppression are performed in different domains suitable for suppression of inter-channel interference and suppression of noise, respectively. This will generally enhance the quality of the channel estimate and thus ensure improved recovery of the transmitted information.

According to a second aspect there is provided a channel estimator configured to estimate a channel based on a reference signal in a wireless communication system. Basically, the channel estimator comprises an estimator configured to estimate an initial representation of the channel based on the reference signal, a first transformer configured to transform the initial channel representation into a first domain suitable for suppression of a first type of disturbance, and a first suppressor configured to perform suppression of the first type of disturbance in the first domain for obtaining a first suppressed channel representation. The channel estimator further comprises a second transformer configured to transform the first suppressed channel representation into a second domain suitable for suppression of a second type of disturbance, and a second suppressor configured to perform suppression of the second type of disturbance in the second domain for obtaining a second suppressed channel representation. The first type of disturbance includes one of inter-channel interference and noise, and the second type of disturbance includes the other one of inter-channel interference and noise, and the second suppressed channel representation is an interference-suppressed and noise-suppressed channel representation.

This will significantly enhance the performance of the channel estimator by effectively separating the interference suppression from the noise suppression in the channel estimator.

There is also provided a radio receiver comprising such a channel estimator, and a radio base station comprising such a receiver.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

It may be useful to begin with a brief overview of a radio receiver for use in a wireless communication system.

Figure 1:
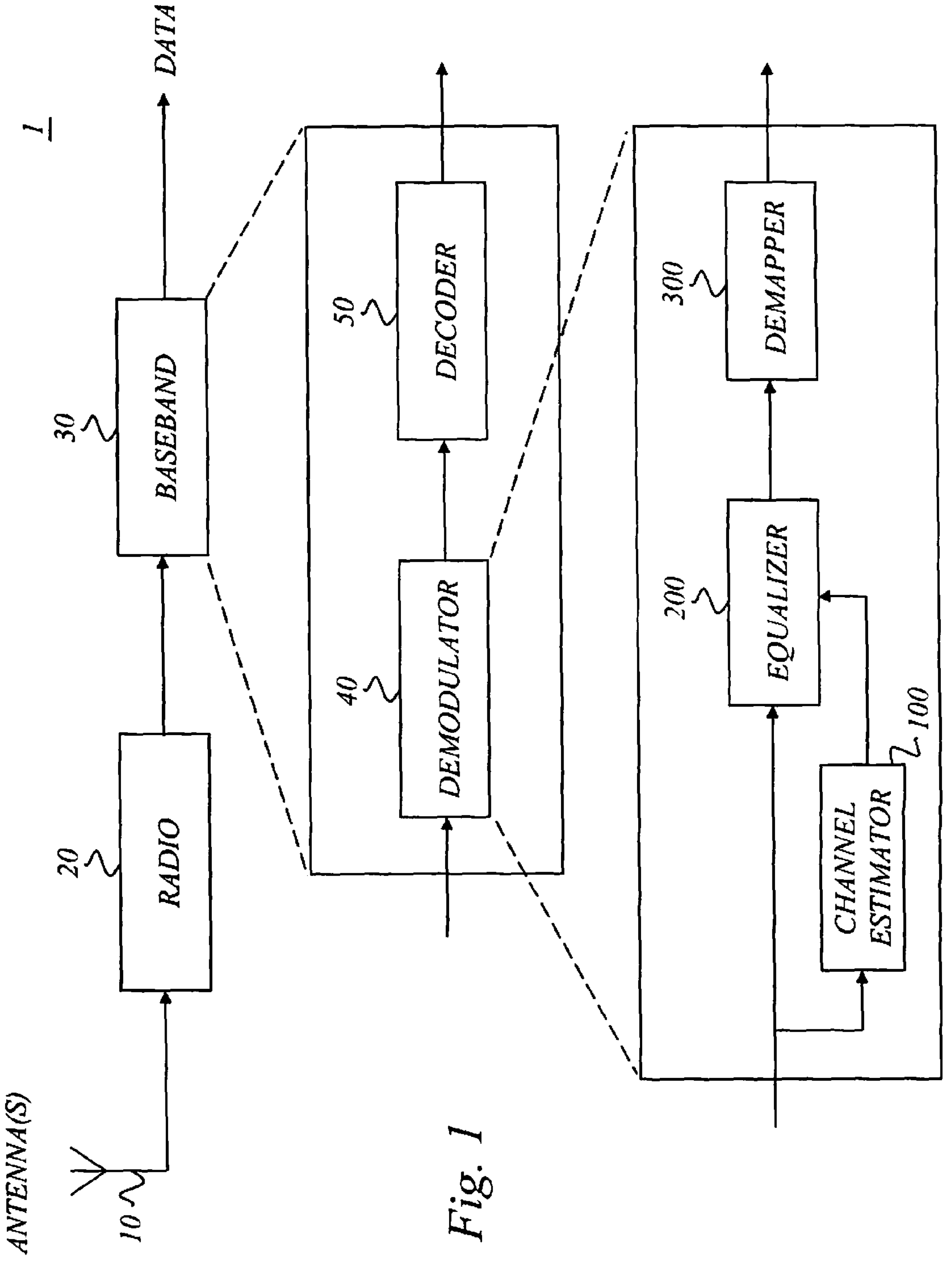
FIG. 1 is a schematic block diagram illustrating a radio receiver for use in a wireless communication system.

FIG. 1 is a schematic block diagram illustrating a radio receiver such as a radio base station for example. The radio receiver 1 basically includes one or more antennas 10, a radio unit 20 and baseband unit 30. The baseband unit 30 normally includes a demodulator 40 and a decoder 50. The demodulator may for example include a channel estimator 100, an equalizer 200 and a demapper 300. The information on the estimated channel from the channel estimator 100 may be used by the equalizer 200 for improving the ability to correctly detect and recover the transmitted information. In general, the channel estimation is based on a reference signal in the wireless communication system.

Figure 2:
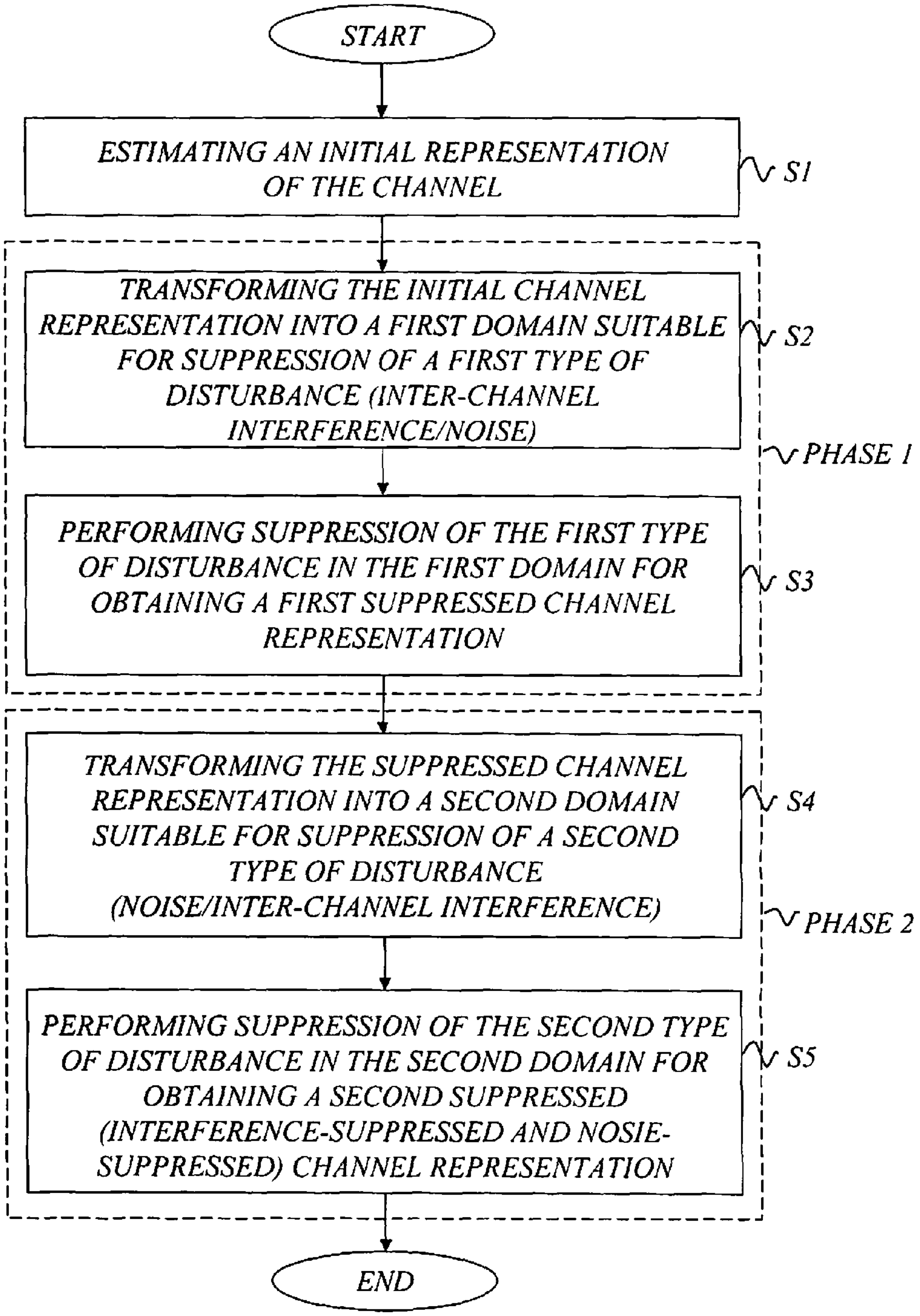
FIG. 2 is a schematic flow diagram illustrating a method for estimating a channel according to an exemplary embodiment.

FIG. 2 is a schematic flow diagram illustrating a method for estimating a channel according to an exemplary embodiment. In step S1 an initial representation of the channel is estimated based on the reference signal. In step S2, the initial channel representation is transformed into a first domain suitable for suppression of a first type of disturbance, and in step S3 suppression of the first type of disturbance is performed in the first domain for obtaining a first suppressed channel representation. In step S4, the first suppressed channel representation is transformed into a second domain suitable for suppression of a second type of disturbance, and in step S5 suppression of the second type of disturbance is performed in the second domain for obtaining a second suppressed channel representation. The first type of disturbance includes one of inter-channel interference and noise, and the second type of disturbance includes the other one of inter-channel interference and noise, and the second suppressed channel representation is thus an interference-suppressed and noise-suppressed channel representation.

In this way, interference suppression can be separated from noise suppression to enable efficient reduction of both interference and noise in the estimated channel. Interference suppression and noise suppression are performed in different domains suitable for suppression of inter-channel interference and suppression of noise, respectively. This will generally enhance the quality of the channel estimate and thus ensure improved recovery of the transmitted information.

In a sense, the steps S2-S3 represent a first phase for improving the initial representation of the channel, and the steps S4-S5 represent a second phase for further improving the channel representation.

In normal circumstances, the noise suppression and the suppression of inter-channel interference can be performed in any order as long as the channel representation is in the suitable domain.

For example, when the first type of disturbance includes inter-channel interference and the second type of disturbance includes noise, the initial channel representation may be transformed into a first domain suitable for suppression of inter-channel interference and then suppression of inter-channel interference is performed. Subsequently, the first suppressed channel representation is transformed into a second domain suitable for suppression of noise, and suppression of noise is then performed in this domain.

Alternatively, when the first type of disturbance includes noise and the second type of disturbance includes inter-channel interference, the initial channel representation may be transformed into a first domain suitable for suppression of noise and then noise suppression is performed. Subsequently, the first suppressed channel representation is transformed into a second domain suitable for suppression of inter-channel interference, and suppression of inter-channel interference is then performed in this domain.

A wide variety of different types of transforms may be used for the respective transformations. For example, the Discrete Fourier Transform (DFT) or the corresponding Inverse DFT (IDFT), the Discrete Cosine Transform (DCT) or the corresponding Inverse DCT (IDCT), and the family of wavelet transforms may be employed.

When it is stated that a transformation is based on e.g. the DFT this means that the transform can be the DFT or the IDFT. Similarly, a transformation based on the DCT means that the transform can be the DCT or the IDCT.

In a particularly useful embodiment, the step of transforming (S2) the initial channel representation into a first domain and/or the step of transforming (S4) the first suppressed channel representation into a second domain includes the step of applying a transform based on the Discrete Fourier Transform (DFT) for transforming the channel representation into a domain suitable for inter-channel interference.

In a particular example, the transformation into a domain suitable for suppression of inter-channel interference includes applying a transform based on the Discrete Fourier Transform (DFT), and the transformation into a domain suitable for suppression of noise includes applying a transform based on the Discrete Cosine Transform (DCT).

In an exemplary embodiment, the steps S1-S5 may be performed for each channel of a set of two or more channels based on a respective one of a corresponding set of reference signals that are phase-rotated with respect to each other, as will be explained in more detail later on. By way of example, the channels may correspond to different users, different transmit antennas and/or different precoding layers in the wireless communication system.

Figure 3:
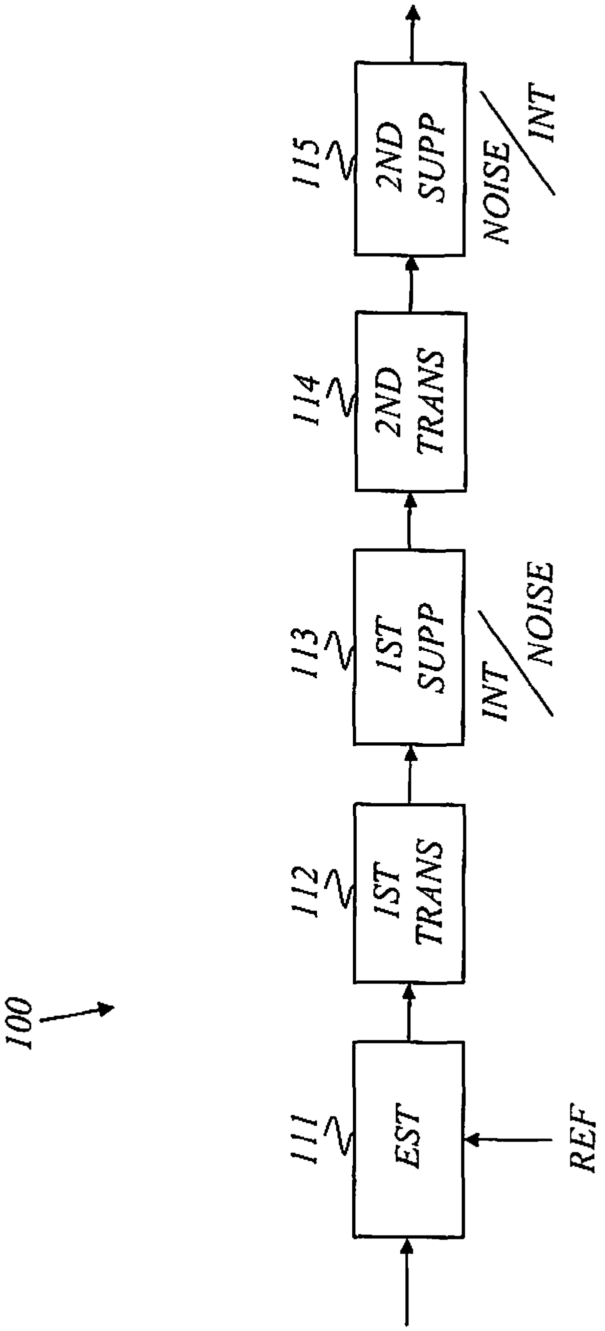
FIG. 3 is a schematic block diagram illustrating a channel estimator according to an exemplary embodiment.

FIG. 3 is a schematic block diagram illustrating a channel estimator according to an exemplary embodiment. In general, the channel estimator 100 is configured to estimate a channel based on a reference signal in a wireless communication system. Basically, the channel estimator 100 comprises an estimator (EST) 111, a first transformer ($1^{st}$ TRANS) 112, a first suppressor ($1^{st}$ SUPP), 113, a second transformer ($2^{nd}$ TRANS) 114 and a second suppressor ($2^{nd}$ SUPP) 115. The estimator 111 is configured to estimate an initial representation of the channel based on the reference signal. The estimator 111 may be configured to use any conventional technique to provide an initial estimate of the channel. The first transformer 112 is configured to transform the initial channel representation into a first domain suitable for suppression of a first type of disturbance. The first suppressor 113 is configured to perform suppression of the first type of disturbance in the first domain for obtaining a first suppressed channel representation. The second transformer 114 is configured to transform the first suppressed channel representation into a second domain suitable for suppression of a second type of disturbance. The second suppressor 115 is configured to perform suppression of the second type of disturbance in the second domain for obtaining a second suppressed channel representation. The first type of disturbance includes one of inter-channel interference (INT) and noise (NOISE), and the second type of disturbance includes the other one of inter-channel interference (INT) and noise (NOISE), and the second suppressed channel representation is thus an interference-suppressed and noise-suppressed channel representation.

This will significantly enhance the performance of the channel estimator 100 by effectively separating the interference suppression from the noise suppression in the channel estimator.

As indicated in FIG. 1, such a channel estimator 100 may be provided in a radio receiver such as a radio base station.

In an exemplary embodiment, the first transformer 112 is configured to transform the initial channel representation into a domain suitable for suppression of inter-channel interference, and the first suppressor 113 is configured as an interference suppressor for suppression of inter-channel interference. The second transformer 114 is configured to transform the first suppressed channel representation into a domain suitable for noise suppression, and the second suppressor 115 is configured as a noise suppressor for suppression of noise.

In an alternative exemplary embodiment, the first transformer 112 is configured to transform the initial channel representation into a domain suitable for suppression of noise, and the first suppressor 113 is configured as a noise suppressor for suppression of noise. The second transformer 114 is then preferably configured to transform the first suppressed channel representation into a domain suitable for suppression of inter-channel interference, and the second suppressor 115 is configured as an inter-channel interference suppressor for suppression of inter-channel interference.

As previously mentioned, different types of transforms may be used to obtain the suitable transformations.

In a particularly useful embodiment, the first transformer 112 and/or the second transformer 114 is configured to apply a transform based on the Discrete Fourier Transform (DFT) for transforming the channel representation into a domain suitable for inter-channel interference.

For example, the first transformer 112 may be configured to apply a transform based on the Discrete Fourier Transform (DFT) if the initial channel representation is to be transformed into a domain suitable for suppression of inter-channel interference and to apply a transform based on the Discrete Cosine Transform (DCT) if the initial channel representation is to be transformed into a domain suitable for suppression of noise. Similarly, the second transformer 114 may be configured to apply a transform based on the Discrete Fourier Transform (DFT) if the first suppressed channel representation is to be transformed into a domain suitable for suppression of inter-channel interference and to apply a transform based on the Discrete Cosine Transform (DCT) if the first suppressed channel representation is to be transformed into a domain suitable for suppression of noise.

The channel estimation method and the channel estimator are generally applicable for estimating channels in wireless communication system, but may be particularly useful in systems based on Orthogonal Frequency Division Multiplexing (OFDM). Likely, the invention will fit in the context of Long Term Evolution (LTE) and LTE Advanced (4G). For example, the invention could be used for Single-Carrier OFDM (SC-OFDM) in the uplink in LTE.

It should however be noted that it could be applicable also to future evolutions of other systems, including Code Division Multiple Access (CDMA), WCDMA (Wideband CDMA), Worldwide Interoperability for Microwave Access (WiMax), Ultra Mobile Broadband (UMB) systems and so forth.

Figure 4:
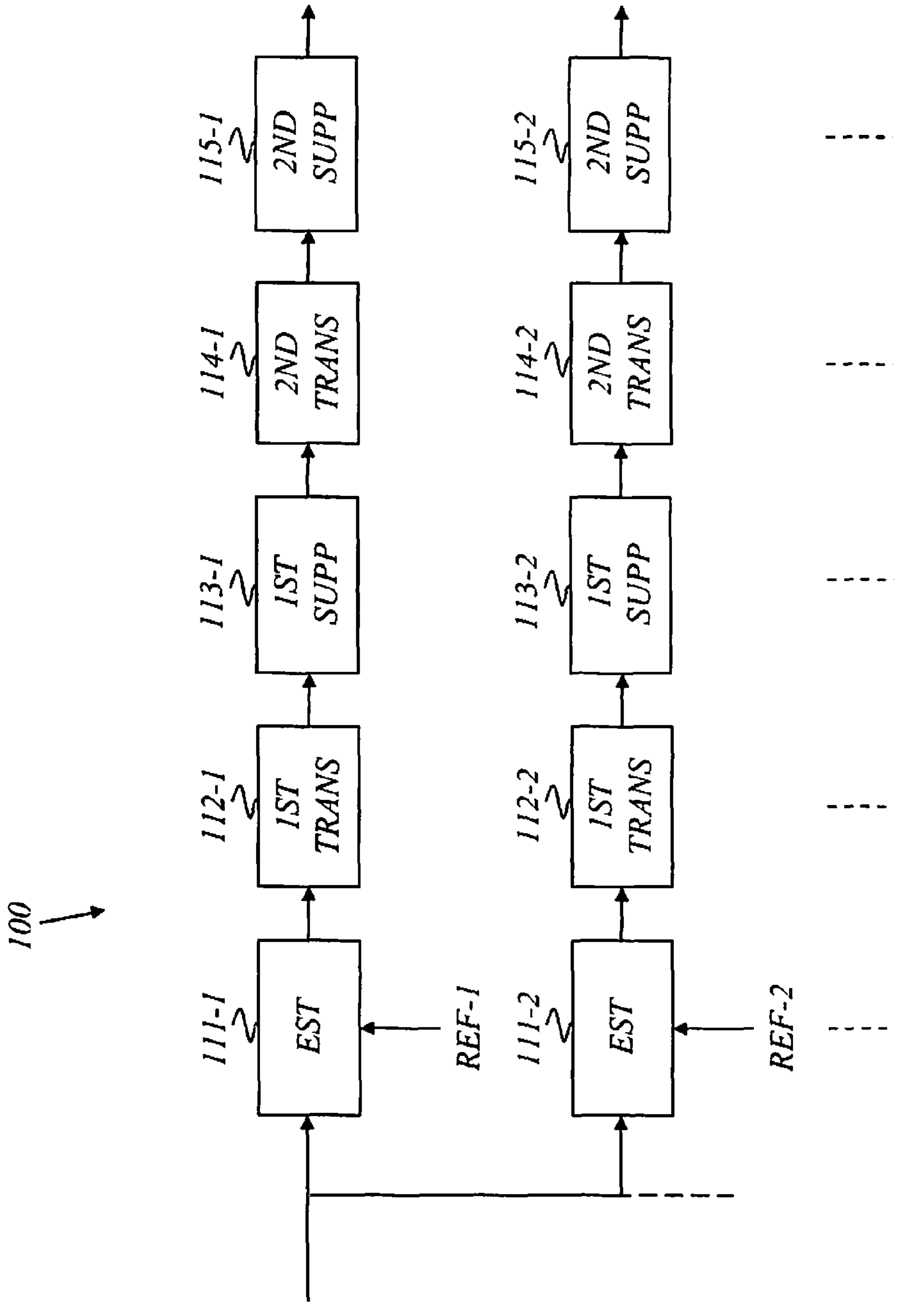
FIG. 4 is a schematic block diagram illustrating a channel estimator according to another exemplary embodiment.

FIG. 4 is a schematic block diagram illustrating a channel estimator according to another exemplary embodiment. In this particular example, the channel estimator 100 comprises at least two channel estimator chains 110, 120. Each channel estimator chain comprises an estimator 111-1/111-2, a first transformer 112-1/112-2, a first suppressor 113-1/113-2, a second transformer 114-1/114-2, and a second suppressor 115-1/115-2 for estimating a respective one of a set of at least two channels based on a respective one of a corresponding set of reference signals REF-1, REF-2 that are phase-rotated with respect to each other. As will be explained below, the two or more channels considered may correspond to different users, different transmit antennas and/or different precoding layers in the wireless communication system.

In general, each channel needs to be estimated independently. This may be done in parallel as indicated above for latency reasons, but there is really nothing that prevents sequential estimation using one and the same estimator chain provided that latency is not crucial.

In certain settings it may be desirable to simultaneously estimate various channels, originating from different user equipment (UE), different transmit antennas and/or different precoding layers, on the same bandwidth, or to estimate an individual channel under the influence of one or more other channels. The reference signals for different channels are normally phase-rotated with respect to each other, and the phase rotation may be user-specific (UE-specific), antenna-specific or layer-specific.

With exemplary reference to the LTE system, the user-specific case may for example correspond to MU-MIMO (Multi User MIMO) in the uplink (UL), where multiple UEs belonging to the same cell are co-scheduled on the same bandwidth. Each UE belonging to the same cell normally employs a different reference signal, which is obtained by combining a common base sequence and a UE-specific phase rotation term. The phase rotation allows the channel estimator at the receiver to separate the contributions from different UEs and estimate their channels.

The antenna-specific and layer-specific cases may for example correspond to SU-MIMO (Single User MIMO) transmission in the uplink (UL), which is expected to be supported in a forthcoming release of e.g. the LTE standard (Rel. 10). With SU-MIMO, multiple transmit antennas are possibly employed to simultaneously transmit different precoding layers, i.e. independent signals associated to different precoding vectors. Two different schemes for the precoding signals include:

If precoded reference signals are employed, a different reference signal is transmitted per layer, where the differentiation is obtained by applying a layer-specific phase rotation.

If non-precoded reference signals are employed, a different reference signal is transmitted per transmit antenna, where the differentiation is obtained by applying an antenna-specific phase rotation.

It cannot be excluded that phase rotations in the reference signals will be employed in other settings besides the above-mentioned cases.

The phase rotation term applied to the base sequence (in the frequency domain) generally generates a translation in the CIR, according to some well known property of Fourier transformations. Therefore, under certain assumptions, the CIRs corresponding to different UEs or transmit antennas/layers are well separated on the estimated CIR and do not interfere with each other.

In this exemplary context, the inventor has recognized that a phase rotation in the frequency domain unfortunately does not correspond to a shift in the DCT domain. Therefore, a conventional DCT-based channel estimator may be suboptimal because it is not able to completely separate the channels provided by different UEs/layers/antennas. This leads to undesired interference, which limits the performance especially in the high Signal-to-Noise Ratio (SNR) region.

An idea is therefore to separate the interference suppression and the noise reduction in the channel estimator.

For example, the former may performed by filtering/windowing in the CIR domain (obtained by IDFT), since different phase rotations result in well separated CIRs. The latter may then be performed, e.g. by a conventional DCT based channel estimator, which can now work on a signal already cleaned from interference.

The description will now focus on some exemplary, non-limiting embodiments. It may however be useful to start with a brief review of a conventional channel estimator, referring to FIG. 5.

Figure 5:
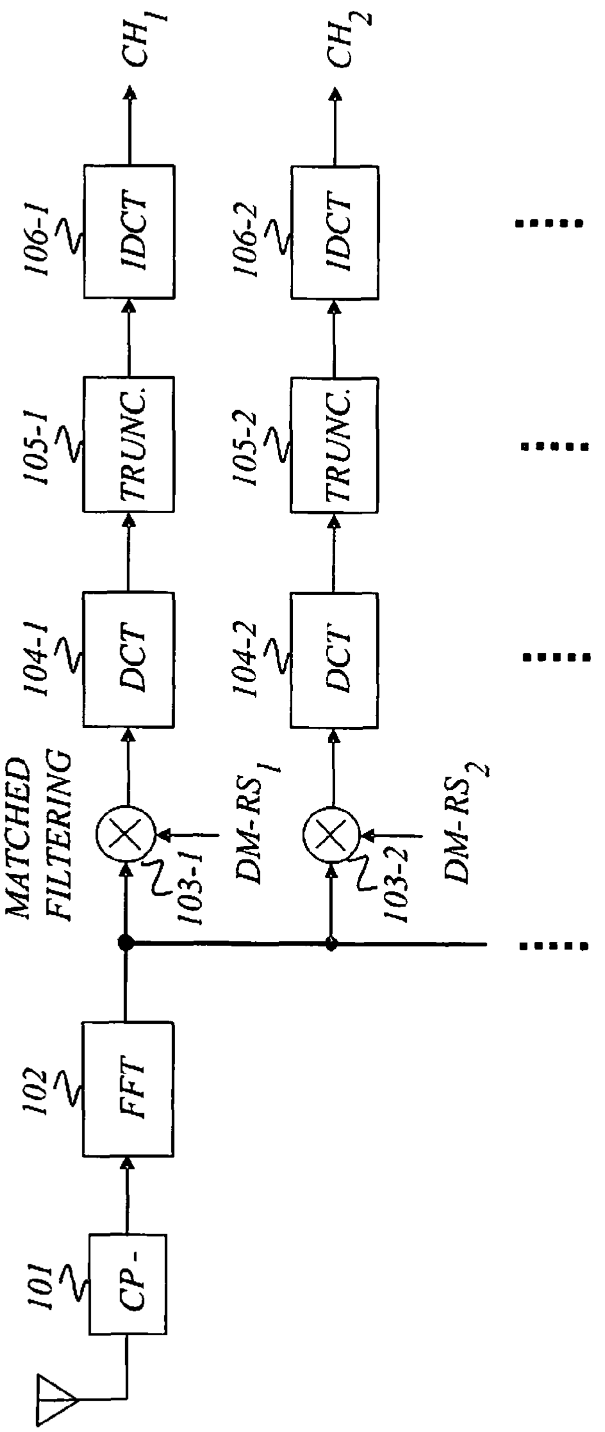
FIG. 5 is a schematic block diagram illustrating an example of a conventional DCT-based channel estimator.

FIG. 5 is a schematic block diagram illustrating an example of a conventional DCT-based channel estimator. By way of example, it is here assumed that the channel estimator is configured for operation in an OFDM system. For simplicity, it is assumed that the receiver includes all the conventional reception devices from the antenna up to the baseband, including devices such as antenna, amplifier(s), frequency conversion to baseband and analog-to-digital conversion/quantization.

The CP-block 101 is configured to eliminate the Cyclic Prefix (CP) usually appended or prepended at the transmitter in OFDM systems. The FFT block 102 is the standard Fast Fourier Transformation block that converts a sampled signal from the time domain to the frequency domain.

In this example, the overall channel estimator includes a number of estimator chains 103-106, of which two estimator chains are explicitly illustrated for obtaining output channel representations $CH_1$, $CH_2$, and so forth.

The signals DM-$RS_k$ (k=1, 2, . . . ) corresponds to the phase-rotated reference signal as transmitted by the kith UE/layer/antenna. In general, matched filtering is the operation of extracting the sub-carriers of the frequency domain OFDM symbol and compensate for the reference signal and the phase rotation applied at the transmitter at each of them so that the resulting signal includes only the frequency domain channel for the desired UE/layer/antenna (at the selected sub-carrier) plus noise and interference from other UEs/layers/antennas. The matched filtering is taken care of by the filtering blocks 103-1, 103-2, and so forth.

In a DCT-based channel estimator, a DCT transformation block 104 is used to perform a transformation based on the DCT transform. Commonly, the DCT Type II transform is employed. The DCT transform has the desirable property to compress most of the energy of a limited bandwidth signal to a limited number of coefficients. This makes it possible to truncate the signal in a truncation block 105, so that the remaining coefficients can be zeroed, leading to a reduction in noise. The truncation block 105 thus truncates the channel representation in order to include only the samples that bear a convenient amount of useful channel power. However, orthogonal phase rotations in the frequency domain are no longer orthogonal in the DCT domain, leading to inter-channel interference. Subsequently, the truncated channel representation from the truncation block 105 is transformed from the DCT domain back to the frequency domain.

It should be noted that similar algorithms can be implemented also with a different realization and/or placement of the matched filter 103 and the truncation block 105.

Figure 6:
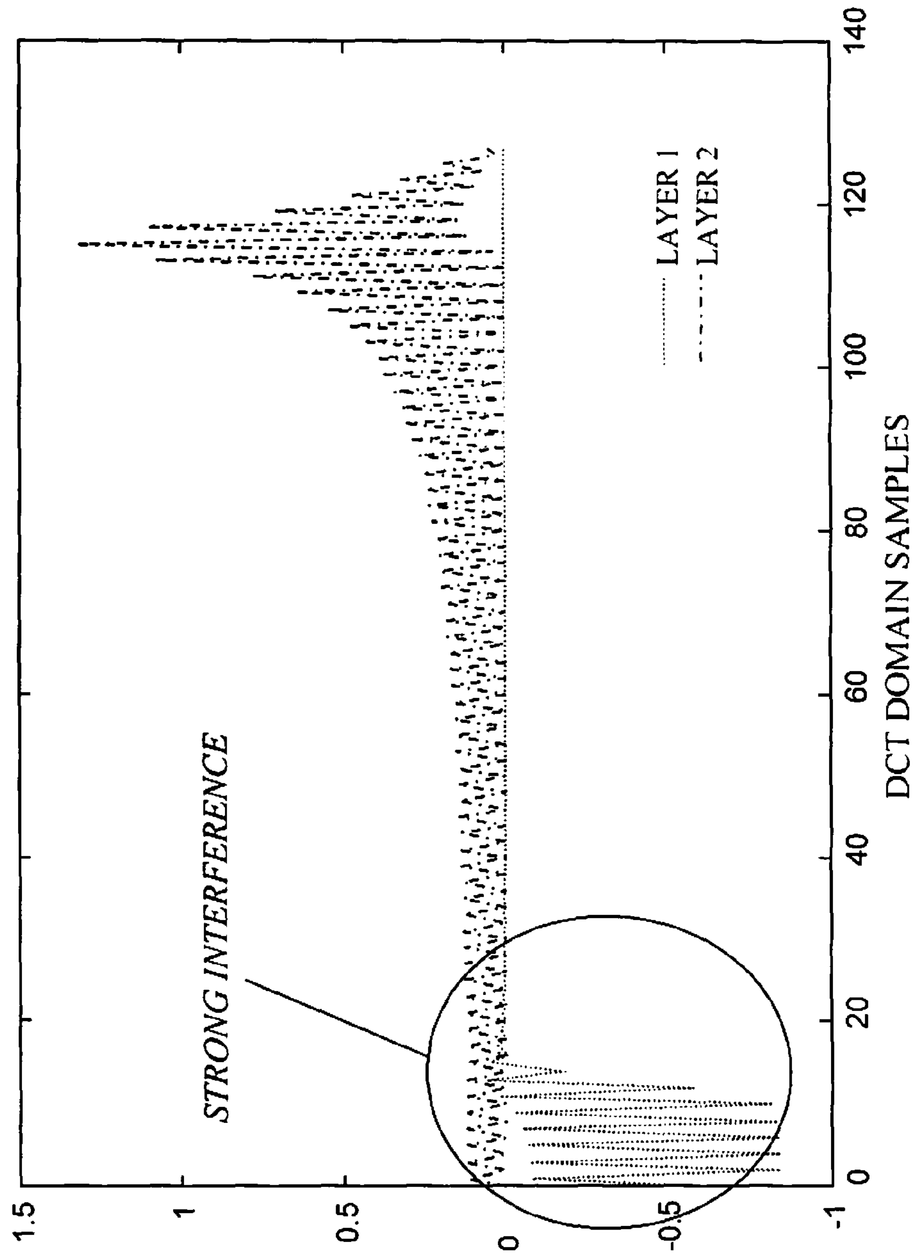
FIG. 6 is a schematic diagram showing an example of DCT domain samples obtained from the conventional DCT-based channel estimator of FIG. 5.

FIG. 6 is a schematic diagram showing an example of DCT domain samples obtained from the conventional DCT-based channel estimator of FIG. 5. The diagram of FIG. 6 show the samples of two different layers/users after the DCT transformation, and it can be seen that a significant amount of interference from the second layer/user is present in the estimated samples of the first layer/user.

In the context of a DCT-based channel estimator, it is feasible to improve the quality of the resulting channel representation by also introducing a transformation into a domain suitable for inter-channel interference suppression and performing such interference suppression, as will be explained in the following with reference to the exemplary block diagrams of FIG. 7 and FIG. 8.

Figure 7:
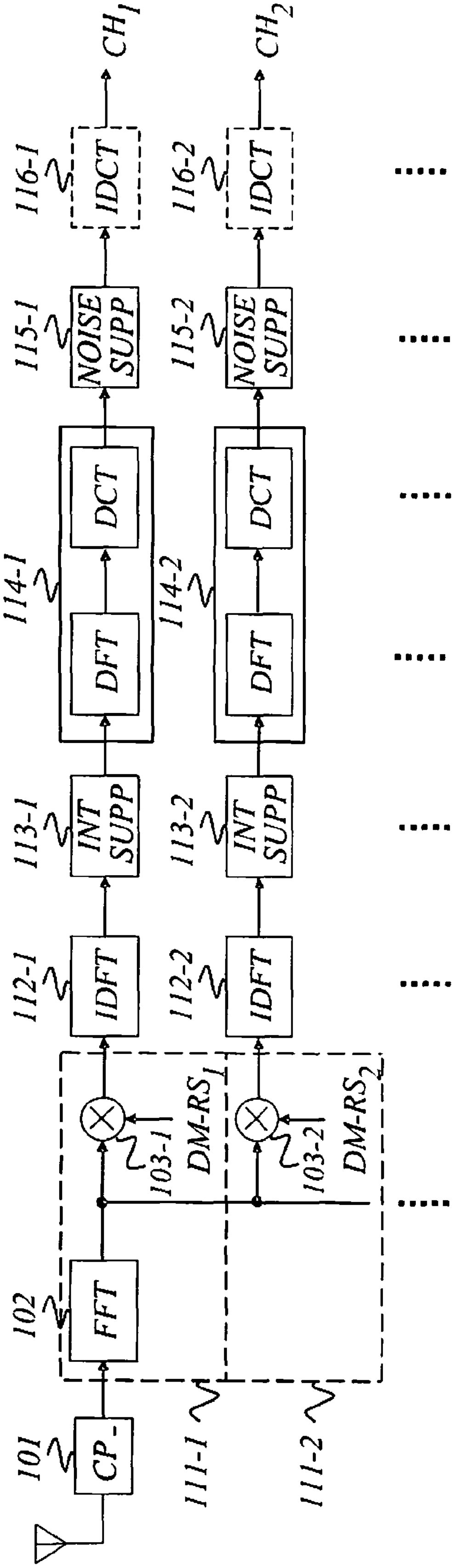
FIG. 7 is a schematic block diagram illustrating an example of an improved channel estimator according to yet another exemplary embodiment.

FIG. 7 is a schematic block diagram illustrating an example of an improved channel estimator according to yet another exemplary embodiment. After the cyclic prefix removal, FFT transformation and matched filtering in blocks 101, 102, 103, a set of initial channel representations will be obtained in each channel estimator chain. The FFT block 102 and the matched filter 103 can logically be regarded as an initial estimator 111. Next, each initial channel representation is sent to an IDFT block 112 for an IDFT transformation. The IDFT transforms the initial channel representation into a domain suitable for suppression of inter-channel interference. In particular, different phase rotations normally result in well separated channel representations in the IDFT/DFT domain. This domain may also be referred to as the CIR domain, and different phase rotations result in well separated CIRs. The transformed channel representation is then subjected to suppression of inter-channel interference in the first (interference) suppressor 113 to obtain a channel representation that is relatively cleaned from interference. For example, a windowing function is applied to select a subset of the useful samples in the IDFT/DFT domain. The position and amount of selected samples in the windowing function may for example be a function of the parameters of the phase rotations. Alternatively, a weighting function is applied instead of hard sample selection. In general, any suitable inter-channel interference suppression or filtering operation may be performed. The resulting interference-suppressed channel representation is then transformed into a domain suitable for noise reduction or noise suppression. This may be accomplished by means of the transformation block 114, which in this case includes a DFT block and a DCT block. If desired, the DFT and DCT block may be merged for implementation efficiency. Anyway, after the transformation the transformed channel representation is subjected to noise suppression in the second (noise) suppressor 115 to clean the channel representation from noise. In this way, a respective channel estimate $CH_1$, $CH_2$, . . . substantially free from both inter-channel interference and noise is obtained from each considered estimator chain.

Optionally, the interference suppressed and noise suppressed channel representation may be transformed by an IDCT transform in block 116 to obtain a channel representation or channel estimate in the same domain as the initial estimate from the matched filter. The IDFT vs. DFT, and DCT vs. IDCT will return the channel representation to the original domain. However, as the skilled person understands, it is possible to use the basic information of an interference suppressed and noise suppressed channel representation regardless of in which domain the channel is represented.

The implementation costs are quite limited and mainly due to the IDFT-DFT transformations, which are usually performed by optimized routines on hardware implementations.

Various alternative implementations are possible. For example, the order of the IDFT and DFT transforms can be exchanged so that the transformation block 112 executes a DFT and that the first sub-block in the transformation block 114 executes an IDFT. The same applies to the DCT and IDCT transforms of blocks 114 and 116.

Figure 8:
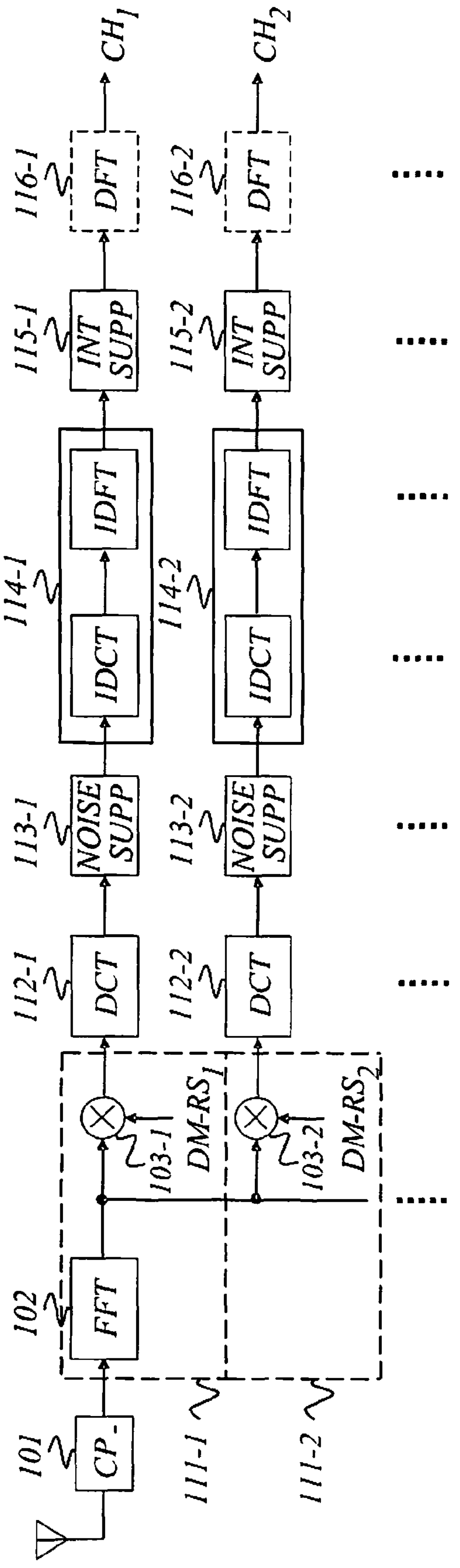
FIG. 8 is a schematic block diagram illustrating an alternative example of an improved channel estimator according to yet another exemplary embodiment.

It is also possible to first remove noise and then suppress interference, as illustrated in the exemplary embodiment of FIG. 8.

FIG. 8 is a schematic block diagram illustrating an alternative example of an improved channel estimator according to yet another exemplary embodiment. In this particular example, the first transformation block 112 executes a DCT transform, and then noise suppression is performed in the first (noise) suppressor 113. The second transformation block 114 includes an IDCT block and an IDFT block, which may be merged for implementation efficiency. The second (interference) suppressor 115 then performs interference suppression. The optional transformation block 116 here executes a DFT transform to get back to the "original" domain.

Figure 9:
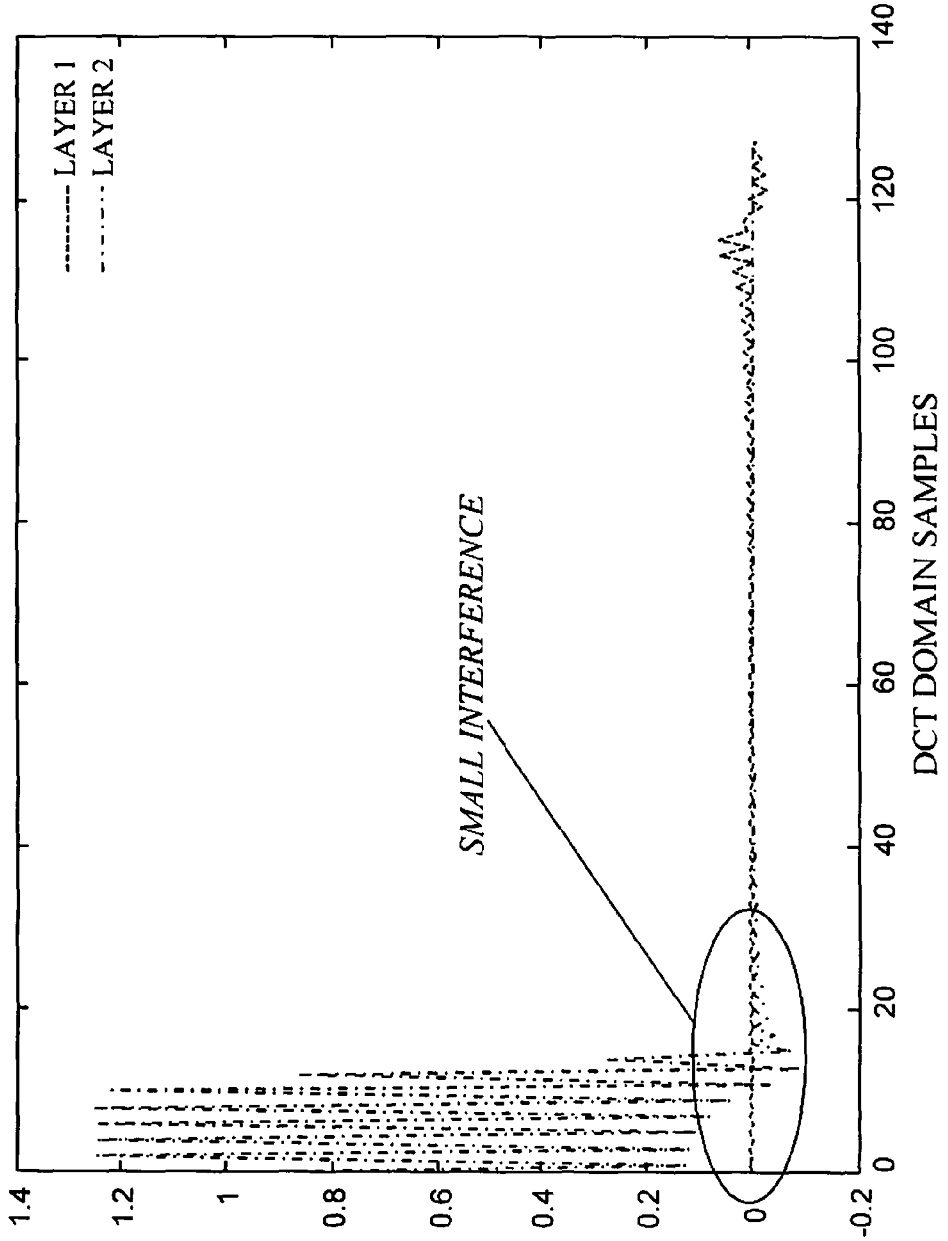
FIG. 9 is a schematic diagram showing an example of DCT domain samples obtained from the improved channel estimator of FIG. 7 or FIG. 8.

FIG. 9 is a schematic diagram showing an example of DCT domain samples obtained from an improved channel estimator. As can be seen, the channel of the first user/layer is now nearly clean from interference.

Figure 10:
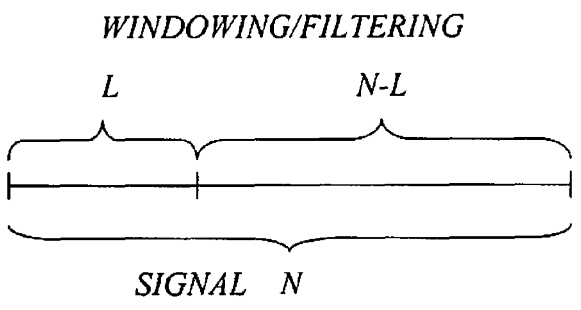
FIG. 10 is a schematic diagram illustrating an example of the relationship between signal length and windowing/filtering length according to an exemplary embodiment.

FIG. 10 is a schematic diagram illustrating an example of the relationship between signal length and windowing/filtering length according to an exemplary embodiment. For the purpose of suppression of noise and suppression of inter-channel interference, a windowing or filtering operation is normally applied. For example, a signal of length N, i.e. a signal having N samples, is considered. An exemplary windowing/filtering operation may be to keep the first L samples and damp or zero the remaining N-L samples. The output signal after the windowing/filtering operation normally still has the length N.

Figure 11A:
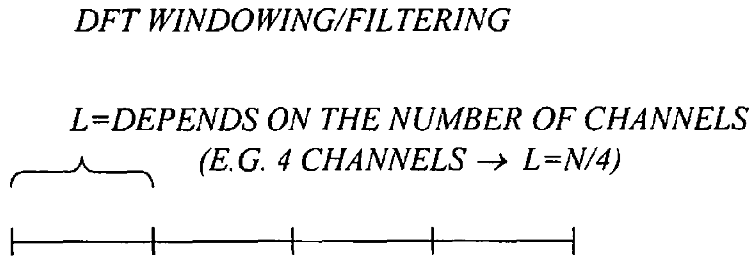
FIG. 11A is a schematic diagram illustrating an example of the DFT windowing/filtering length according to an exemplary embodiment.

FIG. 11A is a schematic diagram illustrating an example of the DFT windowing/filtering length according to an exemplary embodiment. For interference suppression in the DFT domain, L normally depends on the number of channels involved. By way of example, assume that 4 channels/layers are multiplexed with equally spaced cyclic shifts so that the channel replicas are maximally spaced in the time domain. Then a typical setting may be to keep the DFT windowing/filtering to L=N/4 so that the other 3 channels/layers will be suppressed in the DFT domain.

Figure 11B:
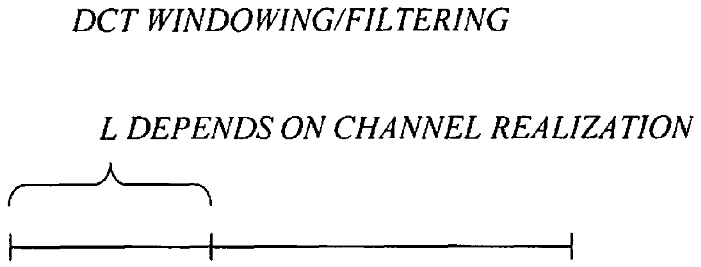
FIG. 11B is a schematic diagram illustrating an example of the DCT windowing/filtering length according to an exemplary embodiment.

FIG. 11B is a schematic diagram illustrating an example of the DCT windowing/filtering length according to an exemplary embodiment. For noise suppression in the DCT domain, L normally depends on the specific channel realization and generally differs from the DFT windowing/filtering.

The functional blocks described above may be implemented in hardware using any conventional hardware technology such as Integrated Circuit (IC) technology. Alternatively, at least some of the functional blocks may be implemented in software for execution on suitable processing hardware such as a microprocessor or digital signal processor.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] "Channel Estimation in OFDM Systems" by Shen et al, Freescale Semiconductor, Inc., 2006.

[2] "Pilot-Symbol-Aided Iterative Channel Estimation for OFDM-Based Systems" by Özbek et al.

[3] US 2008/0112386 A1, May 15, 2008.

[4] "On Improved DCT based Channel Estimation with very low complexity for MIMO-OFDM Systems" by Diallo et al, IEEE 2009.

[5] "Robust DCT based Channel Estimation for MIMO-OFDM Systems" by Diallo et al, IEEE 2009.

The invention claimed is:

1. A method for estimating a channel based on a reference signal in a wireless communication system, said method comprising:

estimating an initial channel representation of said channel based on said reference signal;

transforming the initial channel representation into a first domain suitable for suppression of a first type of disturbance;

performing suppression of said first type of disturbance in said first domain to obtain a first suppressed channel representation;

transforming the first suppressed channel representation into a second domain suitable for suppression of a second type of disturbance; and performing suppression of said second type of disturbance in said second domain to obtain a second suppressed channel representation;

wherein said first type of disturbance includes one of inter-channel interference and noise, and said second type of disturbance includes the other one of inter-channel interference and noise, and said second suppressed channel representation is an interference-suppressed and noise-suppressed channel representation.

2. The method of claim 1, wherein transforming the initial channel representation into a first domain or transforming the first suppressed channel representation into a second domain, or both, includes applying a transform based on the Discrete Fourier Transform (DFT) to transform the channel representation into a domain suitable for inter-channel interference.

3. The method of claim 1, wherein:

transforming the initial channel representation into a first domain includes transforming the initial channel representation into a domain suitable for suppression of inter-channel interference;

performing suppression of said first type of disturbance in said first domain includes performing suppression of inter-channel interference;

transforming the first suppressed channel representation into a second domain includes transforming the first suppressed channel representation into a domain suitable for suppression of noise; and performing suppression of said second type of disturbance includes performing suppression of noise.

4. The method of claim 3, wherein transforming the initial channel representation into a domain suitable for suppression of inter-channel interference includes applying a transform based on the Discrete Fourier Transform (DFT), and wherein transforming the first suppressed channel representation into a domain suitable for suppression of noise includes the step of applying a transform based on the Discrete Cosine Transform (DCT).

5. The method of claim 1, wherein:

transforming the initial channel representation into a first domain includes transforming the initial channel representation into a domain suitable for suppression of noise;

performing suppression of said first type of disturbance includes performing suppression of noise;

transforming the first suppressed channel representation into a second domain includes transforming the first suppressed channel representation into a domain suitable for suppression of inter-channel interference; and performing suppression of said second type of disturbance includes performing suppression of inter-channel interference.

6. The method of claim 5, wherein transforming the initial channel representation into a domain suitable for suppression of noise includes the step of applying a transform based on the Discrete Cosine Transform (DCT) and wherein transforming the first suppressed channel representation into a domain suitable for suppression of inter-channel interference includes applying a transform based on the Discrete Fourier Transform (DFT).

7. The method of claim 1, wherein estimating an initial channel representation, transforming the initial channel representation, performing suppression of said first type of disturbance, transforming the first suppressed channel representation, and performing suppression of said second type of disturbance are performed for each channel of a set of at least two channels, based on a respective one of a corresponding set of reference signals that are phase-rotated with respect to each other.

8. The method of claim 1, wherein said wireless communication system is an Orthogonal Frequency Division Multiplexing (OFDM) communication system.

9. A channel estimator configured to estimate a channel based on a reference signal in a wireless communication system, said channel estimator comprising:

an estimator configured to estimate an initial channel representation of said channel based on said reference signal;

a first transformer configured to transform the initial channel representation into a first domain suitable for suppression of a first type of disturbance;

a first suppressor configured to perform suppression of said first type of disturbance in said first domain for obtaining a first suppressed channel representation;

a second transformer configured to transform the first suppressed channel representation into a second domain suitable for suppression of a second type of disturbance; and a second suppressor configured to perform suppression of said second type of disturbance in said second domain for obtaining a second suppressed channel representation;

wherein said first type of disturbance includes one of inter-channel interference and noise, and said second type of disturbance includes the other one of inter-channel interference and noise, and said second suppressed channel representation is an interference-suppressed and noise-suppressed channel representation.

10. The channel estimator of claim 9, wherein at least one of said first transformer and said second transformer is configured to apply a transform based on the Discrete Fourier Transform (DFT) for transforming the channel representation into a domain suitable for inter-channel interference.

11. The channel estimator of claim 9, wherein:

said first transformer is configured to transform the initial channel representation into a domain suitable for suppression of inter-channel interference;

said first suppressor is configured as an interference suppressor for suppression of inter-channel interference;

said second transformer is configured to transform the first suppressed channel representation into a domain suitable for noise suppression; and said second suppressor is configured as a noise suppressor for suppression of noise.

12. The channel estimator of claim 11, wherein said first transformer is configured to transform the initial channel representation by applying a transform based on the Discrete Fourier Transform (DFT) and wherein said second transformer is configured to transform the first suppressed channel representation by applying a transform based on the Discrete Cosine Transform (DCT).

13. The channel estimator of claim 9, wherein:

said first transformer is configured to transform the initial channel representation into a domain suitable for suppression of noise;

said first suppressor is configured as a noise suppressor for suppression of noise;

said second transformer is configured to transform the first suppressed channel representation into a domain suitable for suppression of inter-channel interference; and said second suppressor is configured as an inter-channel interference suppressor for suppression of inter-channel interference.

14. The channel estimator of claim 13, wherein said first transformer is configured to transform the initial channel representation by applying a transform based on the Discrete Cosine Transform (DCT) and wherein said second transformer is configured to transform the first suppressed channel representation by applying a transform based on the Discrete Fourier Transform (DFT).

15. The channel estimator of claim 9, wherein said channel estimator comprises at least two channel estimator chains, each channel estimator chain comprising said estimator, said first transformer, said first suppressor, said second transformer, and said second suppressor for estimating a respective one of a set of at least two channels based on a respective one of a corresponding set of reference signals that are phase-rotated with respect to each other.

16. The channel estimator of claim 9, wherein said channel estimator is configured for an Orthogonal Frequency Division Multiplexing (OFDM) communication system.

17. A radio receiver comprising the channel estimator of claim 9.

18. A radio base station comprising the radio receiver of claim 17.

* * * * *